United States Patent
Liou et al.

(10) Patent No.: US 7,480,431 B2
(45) Date of Patent: Jan. 20, 2009

(54) THIN FILM TRANSISTOR ARRAY SUBSTRATE AND LIQUID CRYSTAL DISPLAY DEVICES

(75) Inventors: Meng-Chi Liou, Padeh (TW); Yuan-Hao Chang, Padeh (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 274 days.

(21) Appl. No.: 11/594,851

(22) Filed: Nov. 9, 2006

(65) Prior Publication Data

US 2008/0043161 A1   Feb. 21, 2008

(30) Foreign Application Priority Data

Aug. 18, 2006   (TW) .............................. 95130460 A

(51) Int. Cl.
*G02F 1/1343*   (2006.01)
(52) U.S. Cl. ...................................................... 385/39

(58) Field of Classification Search .................... 349/39
See application file for complete search history.

(56) References Cited

U.S. PATENT DOCUMENTS

| | | | |
|---|---|---|---|
| 6,097,454 | A | 8/2000 | Zhang et al. |
| 6,404,465 | B1 | 6/2002 | Nakayama et al. |
| 6,421,102 | B2 | 7/2002 | Nakayama et al. |
| 6,704,066 | B2 | 3/2004 | Tsumura et al. |
| 2001/0002143 | A1 | 5/2001 | Nakayama et al. |

FOREIGN PATENT DOCUMENTS

JP   7-28089 A   1/1995

*Primary Examiner*—Sarah Song
(74) *Attorney, Agent, or Firm*—Jiang Chyun IP Office

(57) ABSTRACT

A thin film transistor array substrate applied to a liquid crystal display device is provided with at least two storage capacitance lines electrically connected with each other. These electrically connected storage capacitance lines, which belong to two adjacent pixels at two sides of a scanning line, are connected with contact holes and conductive layer, and may eliminate the lateral crosstalk of the liquid crystal display device.

16 Claims, 2 Drawing Sheets

THIN FILM TRANSISTOR ARRAY SUBSTRATE AND LIQUID CRYSTAL DISPLAY DEVICES

BACKGROUND OF THE INVENTION

1. Field of the Invention

The present invention relates to a thin film transistor array substrate, and more especially, to a thin film transistor array substrate for a liquid crystal display device.

2. Background of the Related Art

Presently, the displays of portable communication terminals and personal computers are composed principally of liquid crystal panels. For displays of the next generation as alternatives to the liquid crystal panels, organic electroluminescence panels and inorganic electroluminescence panels have been a focus of recent attention. Such displays are provided with pixels disposed in a matrix, and are driven chiefly by two types of driving systems, such as an active matrix driving system or a passive matrix driving system.

An important issue concerning the displays is the occurrence of horizontal or vertical crosstalk. A crosstalk phenomenon refers to one in which a fixed pattern such as a window is displayed with brightness variations in areas horizontally adjoining the pattern. The brightness variations are considered to result from voltage drops on electrode lines, the voltage drops occurring from high currents flowing through the lines. For example, lateral crosstalk usually occurs on a liquid crystal display panel which is with brightness at the pattern of in the order of light and dark line background and black window and may be derived from the voltage drops of common electrodes. Thus, how to reduce crosstalk for enhancing grade of display panel is one of important issues for liquid crystal display device.

SUMMARY OF THE INVENTION

In order to solve the problems mentioned above, the present invention provides a layout of pixel thin film transistor array substrate for a liquid crystal display device. The voltage drops of common electrodes may be eliminated by electrically connecting the storage capacitance lines disposed on the adjacent pixels.

One of objects of the present invention is to provide a thin film transistor array substrate applied to a liquid crystal display device. The adjacent pixels with a scanning line are with electrically connected storage capacitance lines that are disposed randomly over the whole panel.

One of objects of the present invention is to provide a liquid crystal display device with the design of electrical connection of the storage capacitance lines in a pattern manner so as to maintain the opening ratio of the liquid crystal display device.

One of objects of the present invention is to provide a liquid crystal display device with enhanced contrast. A conductive layer is partially overlapped with a storage capacitance line for preventing light leakage.

Accordingly, one embodiment of the present invention provides a thin film transistor array substrate. A plurality of data lines are disposed across scanning lines to define a plurality of pixel regions. A plurality of storage capacitance lines are disposed in the pixel regions. Each of the storage capacitance lines includes a first line component disposed extending essentially in the direction along the scanning lines and a second line component extending essentially in a direction along the data lines and within each of the pixel regions. A plurality of pixel electrodes are disposed in the pixel regions and electrically connected to the thin film transistors. Each of the contact holes is disposed on a terminal of the second line component. A conductive layer connecting the two adjacent second line components are disposed on the two adjacent pixel regions and electrically connected to the second line component through the contact hole.

DETAILED DESCRIPTION OF THE INVENTION

Figure 1:
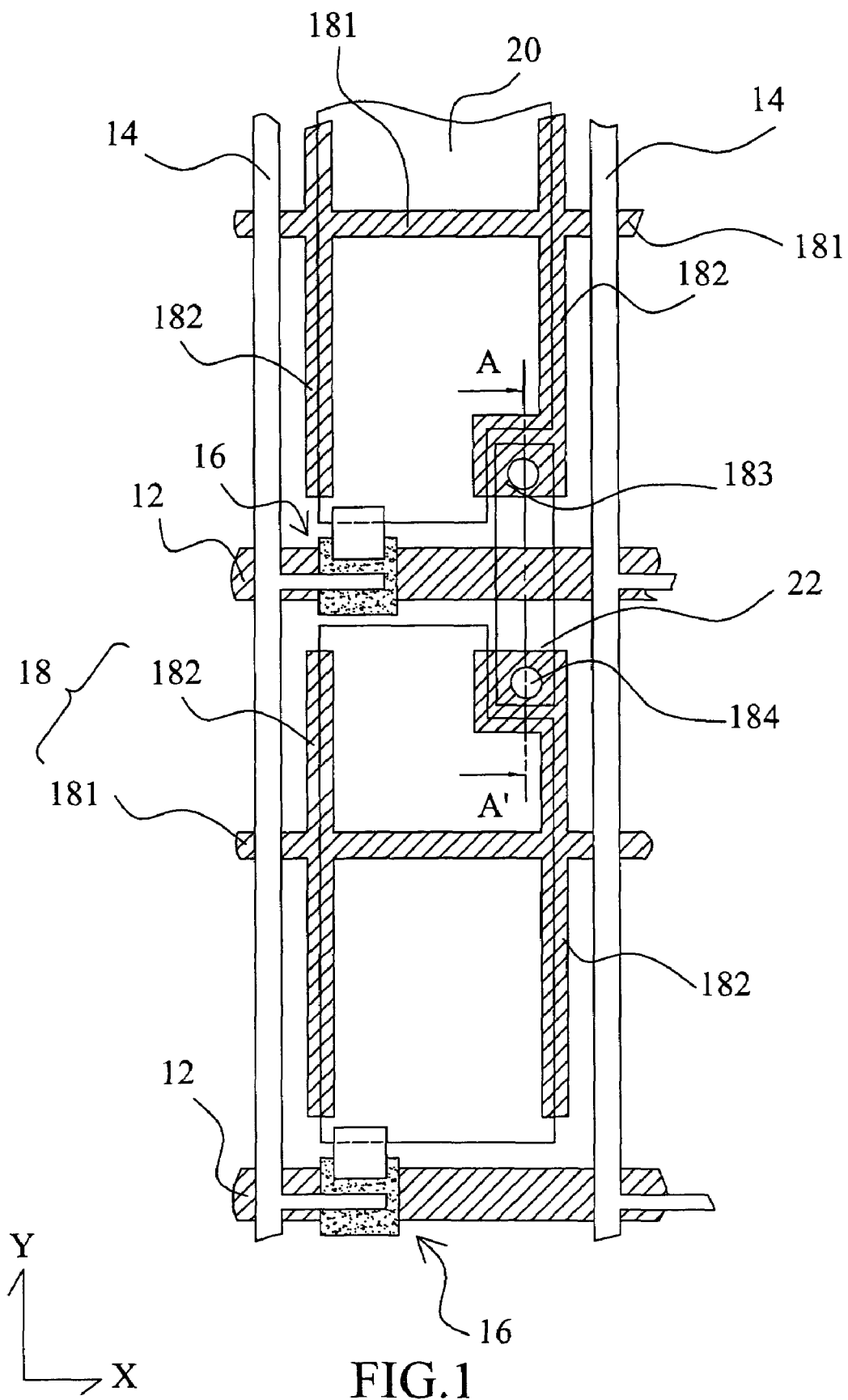
FIG. 1 is a schematically perspective-view diagram illustrating a substrate in accordance with an embodiment of the present invention.

FIG. 1 is a schematically perspective-view diagram illustrating a substrate in accordance with an embodiment of the present invention. A thin film transistor array substrate includes a plurality of scanning lines 12, data lines 14, thin film transistors 16, storage capacitance lines 18, pixel electrodes 20 and a conductive layer 22. The scanning lines 12, also called gate lines, are along a direction, for example, axis X direction in the drawing. The data lines 14, also called source lines, are disposed across the scanning lines 12, such as in the axis Y direction, to define a plurality of pixel regions. Each of the thin film transistors 16 is corresponding to every pixel region. Each of the pixel electrodes 20 is provided in the corresponding pixel region and electrically connected the thin film transistors 16.

Next, the storage capacitance lines 18 are disposed extending over the pixel regions along the scanning lines 12. In one embodiment, each of the storage capacitance lines 18 has a first line component 181 disposed extending essentially in the direction along the scanning lines 12 and a second line component 182 disposed extending essentially in the direction along the data lines 14 and within each of the pixel regions. In the embodiment, the first line component 181 and the two second line components 182 make up an unit of storage capacitance line 18 corresponding to each of the pixel regions. Furthermore, there is an extended portion 183 disposed on one terminal of one second line component 182 that is away from the corresponding thin film transistor 16, when compared with the other second line component 182.

As one of features of the present invention, a conductive contact hole 184 is disposed on the extended portion 183 for some second line components 182. In the embodiment, two conductive contact holes 184 may be respectively disposed on the two second line components 182 that are adjacent to one scanning line 12. Furthermore, for the thin film transistor array substrate, the contact holes 184 are disposed randomly or in a patterned manner. For example, if the phenomenon of lateral crosstalk is frequently observed on some fields of one liquid crystal display device, the conductive contact holes 184 may be designed to distribute on the identical fields. Alternatively, even no explicit phenomenon of lateral crosstalk is observed, the conductive contact holes 184 may be disposed randomly for sure of display grade. Furthermore, the conductive contact holes 184 may be disposed for sure of little influence of the opening ratio of a display, such as 0.7% brightness reduce to which human eyes are not sensitive.

In the embodiment, the function of the contact holes 184 is associated with the design of the conductive layer 22. For any two adjacent pixel regions referenced to the scanning line 12, the conductive layer 20 is disposed on the two second line components 182 having the contact holes 184 to electrically connect the two second line components 182. Accordingly, the conductive layer 22 further crosses over the scanning line 12 between the contact holes 184. Though about 5% increase may be loaded on the scanning line 12 due to the crossing of the conductive layer 22, it may cause neglect influences on the wave transmission and transferring for the scanning line 12. Furthermore, one of features of the present invention is to overlap the pixel electrode 20 on the portion of the second line component 182 to enhance the contrast of a liquid crystal display device. Accordingly, the design of the exemplary pixel electrode 20 may be applied to various types of display panels, such as TN (Twisted Nematic), MVA (Multi-domain Vertically Align) or MHA (Multi-domain Homeotropic Align) types.

Figure 2:
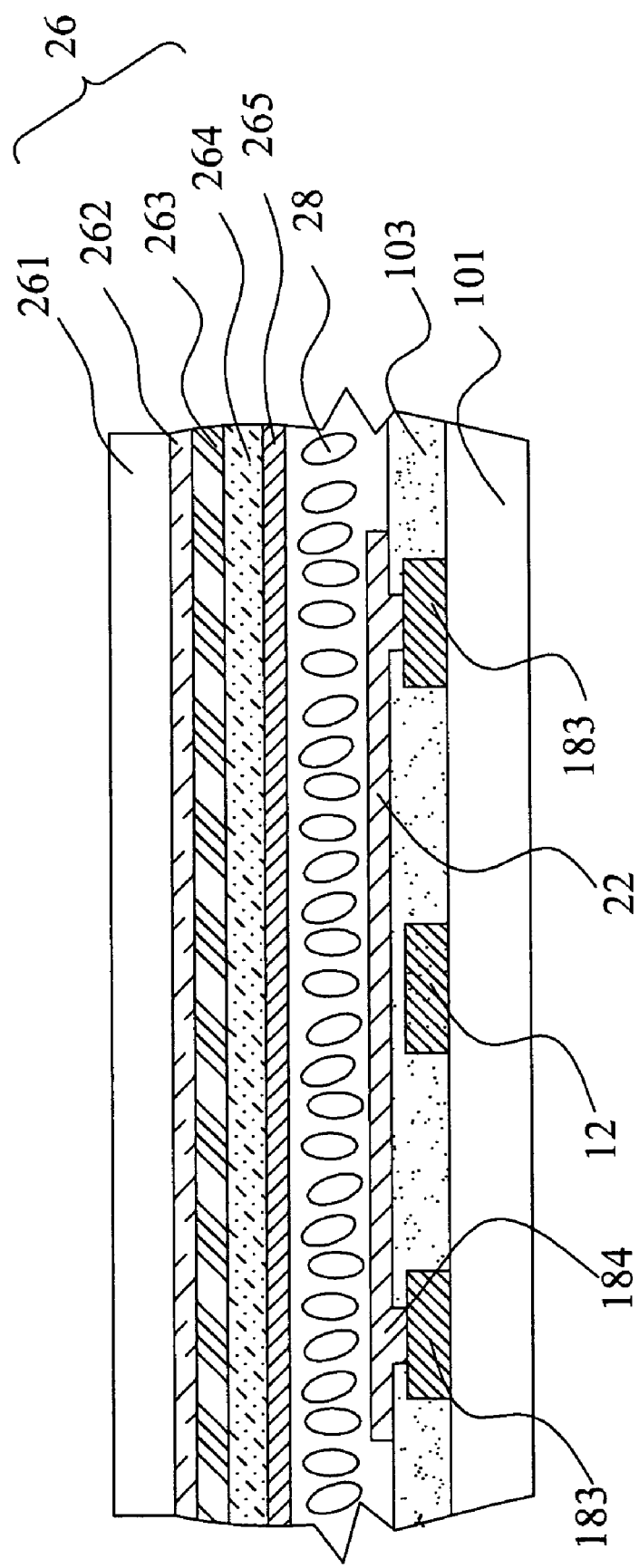
FIG. 2 is a schematically cross-sectional diagram illustrating the liquid crystal display device with a thin film transistor array substrate along with line AA' of FIG. 1 in accordance with the present invention.

FIG. 2 is a schematically cross-sectional diagram illustrating the liquid crystal display device with a thin film transistor array substrate along with line AA' of FIG. 1 in accordance with the present invention. The liquid crystal device includes a color-filter substrate structure 26 and the thin film transistor array substrate opposite to each other and a liquid crystal layer 28 therebetween. In one embodiment, the color-filter substrate structure 26, not limited to, may include a color filter layer 262, a passivation layer 263, a common electrode 264 and a polyimide alignment film 265. On the other hand, for the thin film transistor array substrate, a first metal layer 102 is formed on a glass substrate 101 and then pattern-transferred to form the scanning line 12 and the storage capacitance lines. Next, an insulating layer 103 is formed on the scanning line 12 and the storage capacitance line during suitable steps. As one of features of the present invention, the insulating layer 103 is pattern-transferred to form the contact holes on the second line components 182 of the storage capacitance line. The conductive layer is filled into the contact holes to form the conductive contact holes 184 and covered on the insulating layer 103. A lithography process is applied to the conductive layer to form the patterned pixel electrode 20 and conductive layer 22. Accordingly, the conductive layer 22 is crossed over the scanning line 12 to electrically connect the two storage capacitance lines.

Although the present invention has been explained in relation to its preferred embodiment, it is to be understood that other modifications and variation can be made without departing the spirit and scope of the invention as hereafter claimed.

What is claimed is:

1. A thin film transistor array substrate, comprising:
a plurality of scanning lines;
a plurality of data lines disposed across said scanning lines to define a plurality of pixel regions;
a plurality of thin film transistors;
a plurality of storage capacitance lines disposed in each of said pixel regions, wherein each of said storage capacitance lines comprises a first line component extending essentially in a direction along said scanning lines and a second line component extending essentially in a direction along said data lines;
a plurality of pixel electrodes disposed within said pixel regions and electrically connected said thin film transistors;
a plurality of contact holes, wherein each of said contact holes is disposed on a terminal of said second line component; and
a conductive layer connected said second line components disposed on two adjacent pixel regions and electrically connected said second line component through said contact hole.

2. The thin film transistor array substrate according to claim 1, wherein said contact holes are disposed randomly on said pixel regions.

3. The thin film transistor array substrate according to claim 1, wherein said contact holes are disposed in a pattern manner on said pixel regions.

4. The thin film transistor array substrate according to claim 1, wherein any said second line component having said contact hole has an extended portion on a terminal of said second line component for positioning said contact hole.

5. The thin film transistor array substrate according to claim 1, wherein said conductive layer which is disposed on said second line component having said contact hole further crosses said scanning line between two adjacent pixel regions.

6. The thin film transistor array substrate according to claim 1, wherein two said second line components are disposed oppositely in each pixel region.

7. The thin film transistor array substrate according to claim 6, wherein said second line component having said contact hole is away from said thin film transistor for each pixel region.

8. The thin film transistor array substrate according to claim 6, wherein each of said pixel electrode is further disposed between said two second line components and overlapped with a portion of said two second line components.

9. A liquid crystal display device comprising:
a first substrate structure;
a second substrate structure disposed opposite to said first substrate, wherein said second substrate structure comprises:
a plurality of scanning lines;
a plurality of data disposed across said scanning lines to define a plurality of pixel regions;
a plurality of storage capacitance lines disposed in each said pixel region, wherein each said storage capacitance line comprises a first line component extending essentially in a direction along said scanning lines and a second line component extending essentially in a direction along said data lines;
a plurality of pixel electrodesly disposed within said pixel regions;
a plurality of contact holes, wherein each of said contact holes is disposed on a terminal of said second line component; and
a conductive layer connecting said second line components disposed on two adjacent pixel regions and electrically connected said second line component through said contact hole; and
a liquid crystal layer held between said first substrate structure and said second substrate structure.

10. The liquid crystal display device according to claim 9, wherein said second substrate structure further comprises a thin film transistor in each said pixel region.

11. The liquid crystal display device according to claim 9, wherein said contact holes are disposed randomly on said pixel regions.

12. The liquid crystal display device according to claim 9, wherein said contact holes are disposed in a pattern manner on said pixel regions.

13. The liquid crystal display device according to claim 9, wherein said conductive layer which is disposed on said second line component having said contact hole further crosses over said scanning line between two adjacent pixel regions.

14. The liquid crystal display device according to claim 9, wherein said first substrate structure comprises:
a glass substrate;
a color filter layer on said glass substrate;
a common electrode on said color filter layer; and
an alignment film on said common electrode.

15. The liquid crystal display device according to claim 9, wherein said scanning lines and said storage capacitance lines are made of a same layer of metal on a glass substrate.

16. The liquid crystal display device according to claim 9, wherein said pixel region and said conductive layers are made of a layer of indium tin oxide.

* * * * *